(12) United States Patent
Schwalbach et al.

(10) Patent No.: US 8,857,860 B2
(45) Date of Patent: Oct. 14, 2014

(54) COUPLING ASSEMBLY WITH CORROSION BARRIER FOR GRE-LINED PREMIUM THREADED PIPE

(75) Inventors: Joseph A. Schwalbach, Midland, TX (US); Donald R. Warr, Midland, TX (US)

(73) Assignee: Composite Lining Systems, LP, Midland, TX (US)

( * ) Notice: Subject to any disclaimer, the term of this patent is extended or adjusted under 35 U.S.C. 154(b) by 0 days.

(21) Appl. No.: 13/074,481

(22) Filed: Mar. 29, 2011

(65) Prior Publication Data
US 2012/0248766 A1    Oct. 4, 2012

(51) Int. Cl.
*F16L 15/04*    (2006.01)
*F16L 58/18*    (2006.01)
*F16L 9/14*    (2006.01)

(52) U.S. Cl.
CPC ............... *F16L 58/182* (2013.01); *F16L 9/14* (2013.01); *F16L 15/04* (2013.01)
USPC ........................... 285/333; 285/334; 285/383

(58) Field of Classification Search
USPC .................... 285/333–334, 355, 383, 390
See application file for complete search history.

(56) References Cited

U.S. PATENT DOCUMENTS

| | | | |
|---|---|---|---|
| 1,889,868 A | 12/1932 | Montgomery | |
| 1,909,075 A * | 5/1933 | Ricker et al. | 285/123.3 |
| 2,340,537 A * | 2/1944 | Keener | 285/55 |
| 3,047,937 A * | 8/1962 | De Vecchi | 29/890.14 |
| 3,253,841 A * | 5/1966 | Ahmad | 285/55 |
| 3,298,716 A * | 1/1967 | Taylor et al. | 285/55 |
| 3,339,945 A | 9/1967 | McCrory, Jr. et al. | |
| 3,498,648 A | 3/1970 | Hallesy | |
| 4,509,776 A * | 4/1985 | Yoshida et al. | 285/55 |
| 4,538,841 A | 9/1985 | Royston | |
| 4,568,113 A * | 2/1986 | Axford et al. | 285/334 |
| 4,600,219 A * | 7/1986 | Yoshida et al. | 285/55 |
| 4,706,997 A | 11/1987 | Carstensen | |
| 4,878,285 A | 11/1989 | Carstensen | |
| 5,094,492 A | 3/1992 | Levivier | |
| 5,263,748 A | 11/1993 | Carstensen | |
| 5,320,388 A * | 6/1994 | Lacy et al. | 285/55 |
| 6,042,153 A | 3/2000 | DeLange et al. | |
| 6,176,524 B1 * | 1/2001 | Tsuru et al. | 285/55 |
| 6,273,474 B1 | 8/2001 | DeLange et al. | |
| 6,312,024 B1 * | 11/2001 | Dutilleul et al. | 285/333 |
| 7,195,287 B2 | 3/2007 | Wai | |
| 7,360,797 B2 | 4/2008 | Posson | |
| 7,490,866 B2 | 2/2009 | Webb et al. | |
| 7,731,246 B2 | 6/2010 | McLaughlin | |
| 2009/0295146 A1 | 12/2009 | Zapata | |
| 2010/0102554 A1 | 4/2010 | Xu | |

FOREIGN PATENT DOCUMENTS

| | | |
|---|---|---|
| GB | 694268 | 7/1953 |
| GB | 881428 | 11/1961 |
| GB | 1355897 | 6/1974 |

\* cited by examiner

*Primary Examiner* — Aaron Dunwoody
*Assistant Examiner* — Fannie Kee
(74) *Attorney, Agent, or Firm* — Locke Lord LLP

(57) ABSTRACT

A corrosion resistant coupling assembly for two glass-lined, premium threaded pipe joints, the coupling assembly having opposed liner end wedge flanges that engage and trap a compressible, reinforced polymeric ring disposed between them, wherein the compressible ring has a wedge-shaped cross-section with oppositely facing, oppositely inclined side surfaces, so that each oppositely inclined side surface contacts and abuts against an oppositely disposed, cooperatively inclined surface of a liner end wedge flange to provide a corrosion-resistant barrier between the two pipe joints when the pin end and the box end are threadedly engaged and tightened to compress the polymeric ring.

7 Claims, 2 Drawing Sheets

COUPLING ASSEMBLY WITH CORROSION BARRIER FOR GRE-LINED PREMIUM THREADED PIPE

BACKGROUND OF THE INVENTION

1. Field of the Invention

This invention relates to a coupling assembly with a corrosion barrier for use with premium threaded pipe having a glass reinforced epoxy ("GRE") lining system installed. More particularly, the invention relates to a coupling assembly for GRE-lined premium threaded pipe that comprises a glass reinforced polymeric compression ring having a wedge-shaped cross-section with oppositely facing, oppositely inclined side surfaces, each of which contacts and abuts against an oppositely disposed, cooperatively inclined surface of a liner end wedge flange to provide a corrosion barrier when compressed between a coupling member and two coaxially disposed premium threaded pipe joints.

2. Description of Related Art

A need exists for an effective and economical coupling assembly with a corrosion barrier for GRE-lined premium threaded pipe joints.

Previously known coupling systems are disclosed in the following references: U.S. Pat. Nos. 1,889,868; 3,339,945; 4,706,997; 4,878,285; 5,263,748; 6,042,153; 6,273,474; 7,360,797; and 7,731,246; and in U.S. Pre-patent Publication No. 20090295146.

SUMMARY OF THE INVENTION

An assembly with a corrosion barrier is disclosed for use in coupling coaxially disposed, premium threaded pipe joints having a GRE lining system installed. A preferred embodiment of the subject assembly comprises a coupling member and two liner end wedge flanges in combination with a reinforced polymeric compression ring. The polymeric compression ring preferably comprises a wedge-shaped cross-section with oppositely facing, oppositely inclined side surfaces, each of which contacts and abuts against an oppositely disposed, cooperatively inclined surface of a GRE liner end wedge flange to provide a corrosion resistant corrosion barrier between two adjacent, coaxially aligned, GRE-lined premium threaded pipe joints. A preferred material for use as the reinforced polymeric compression ring is glass reinforced polytetrafluoroethylene ("PTFE").

BRIEF DESCRIPTION OF THE DRAWINGS

The apparatus of the invention is further described and explained in relation to the following drawings wherein.

Like reference numerals are used to indicate like parts in all figures of the drawings.

DESCRIPTION OF THE PREFERRED EMBODIMENTS

Figure 1:
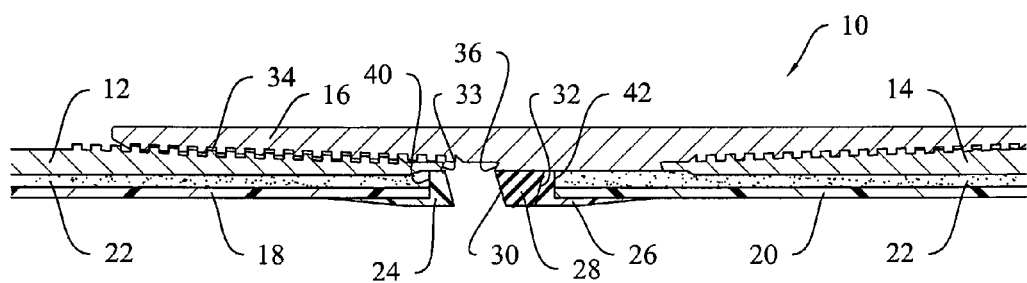
FIG. 1 is a cross-sectional elevation view through one side of a coupling assembly of the invention for two premium threaded pipe joints each having a GRE lining system installed, with the liner end wedge flange of the pin end shown prior to contacting the compressible polymeric ring of the invention.

Referring to FIG. 1, according to one embodiment of the invention, coupling assembly 10 is provided to form a corrosion resistant barrier between two coaxially aligned and threadedly engaged, GRE-lined pipe joints each having a premium threaded pin end 12, 14 threadedly engaging one of the oppositely facing box ends of coupling member 16, respectively. Coupling assembly 10 of the invention is preferable for use as a coupling assembly or system for tubing or casing having a GRE lining system installed. Each pin end 12, 14 is provided with GRE liner 18, 20 that is held in place by a layer of adhesive or cement 22. Each box end of coupling member 16 is threadedly connected to a pin end 12,14, which is provided with GRE liner 20 that is also held in place by a layer of adhesive or cement 22. The two box ends of coupling member 16 are separated by an inwardly facing surface that is unthreaded.

Coupling assembly 10 preferably comprises a compressible ring 28 that is disposed between two opposed plastic liner end wedge flanges 24, 26, which are located at the ends of GRE liners 18, 20, respectively. As shown in FIG. 1, inclined side surface 32 of compressible ring 28 is seated against liner end wedge flange 26, and liner end wedge flange 26 in turn has surface 42 seated against the end of GRE liner 20. Similarly, line end wedge flange 24 has surface 40 seated against the end of GRE liner 18. The surface of compressible ring 28 that faces radially outward relative to the longitudinal axis through the pipe is slidably engaging the unthreaded inside surface of coupling 16 between the oppositely facing box ends. Pin end 12 is partially threaded into the adjacent box end of coupling 16, and the inclined side surface of liner end wedge flange 24 is still spaced apart from the cooperatively aligned, inclined side surface 30 of compressible ring 28. The oppositely disposed side surfaces 30, 32 of compressible ring 28 are also oppositely inclined, with the width of compressible ring 28, when shown in cross-section, being narrower at the surface facing radially inward relative to the longitudinal axis of the pipe than at the surface facing coupling member 16.

Figure 2:
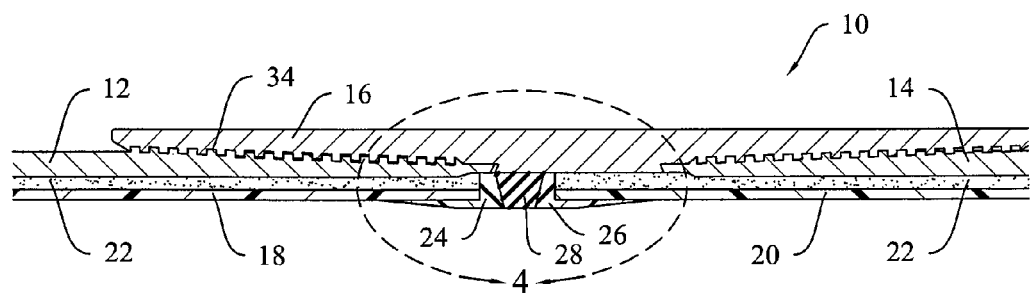
FIG. 2 is a cross-sectional elevation view through one side of the coupling assembly of FIG. 1, with the liner end wedge flange of the pin end shown upon contacting the compressible polymeric ring of the invention.
Figure 4:
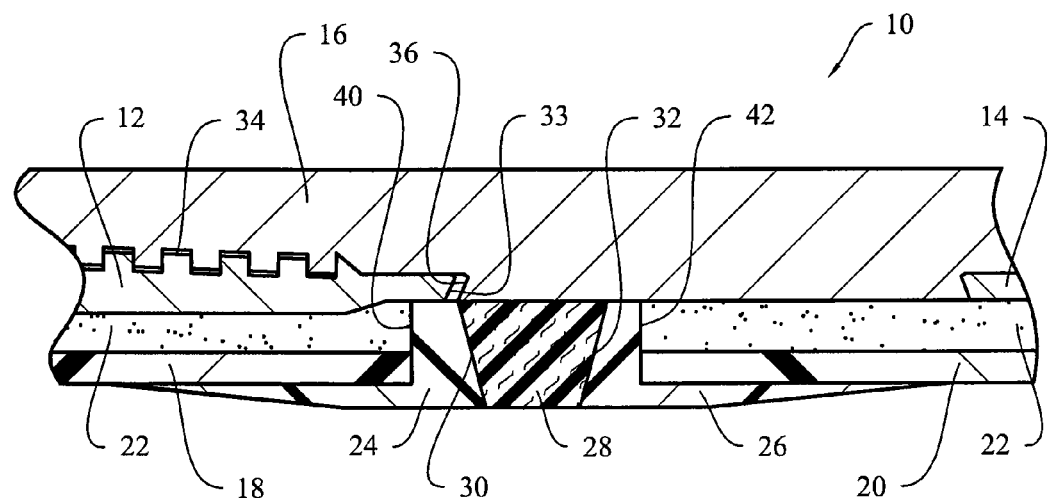
FIG. 4 is a cross-sectional detail view taken from FIG. 2.

Referring to FIG. 2, the central portion of which is shown in greater detail in FIG. 4, pin end 12 has advanced sufficiently into the adjacent box end of coupling member 16 that the leading, inclined surface of liner end wedge flange 24 is contacting, but not yet compressing, compressible ring 28. When liner end wedge flange 24 is disposed in this position relative to compressible ring 28, as seen in FIG. 4, leading edge 33 of pin end 12 is not abutting against cooperatively aligned annular torque shoulder 36 of the adjacent box end of coupling member 16. At this point, coupling assembly 10 is fully assembled but has not yet been sufficiently tightened to compress compressible ring 28 and thereby provide a corrosion-resistant barrier in which no metal portions of pin ends 12, 14 or of coupling member 16 are subjected to direct contact by a fluid that passes through the tubulars during use.

Figure 3:
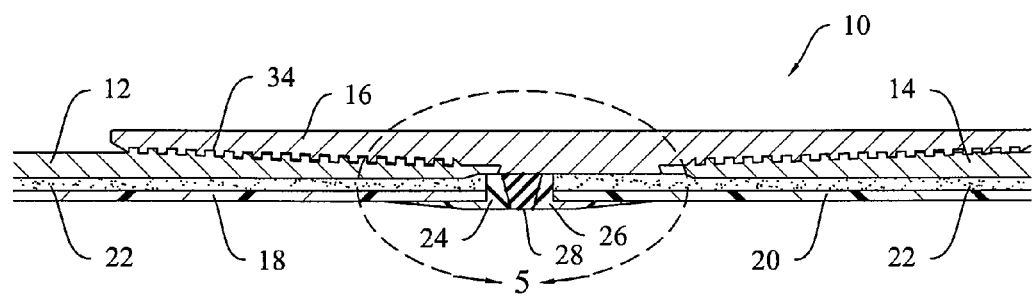
FIG. 3 is a cross-sectional elevation view through one side of the coupling assembly of FIGS. 1 and 2, with the liner end wedge flanges of the pin ends shown fully engaging the compressed polymeric ring of the invention to produce a corrosion barrier between the coupled pipe joints and the inside wall of coupling 16.
Figure 5:
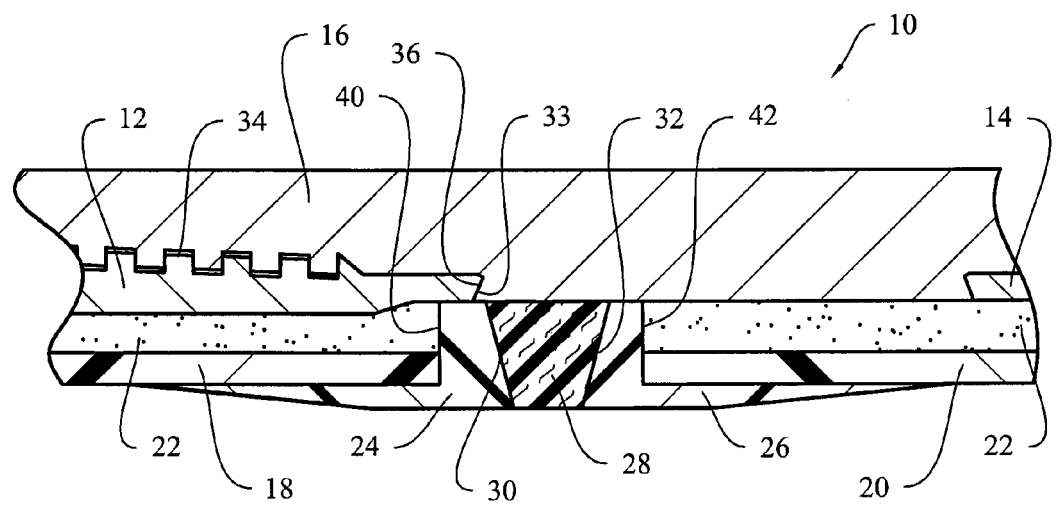
FIG. 5 is a cross-sectional detail view taken from FIG. 3.

Referring next to FIG. 3, the central portion of which is shown in greater detail in FIG. 5, pin end 12 has advanced sufficiently into the adjacent box end of coupling member 16 that the leading, inclined surface of liner end wedge flange 24 is compressing compressible ring 28, so that coupling assembly 10 thereby produces a corrosion resistant, barrier between pin end 12 and the adjacent box end of coupling member 16. When pin end 12 is in this position relative to the box end of coupling 16, leading edge 33 of pin end 12 will closely approach and abut against cooperating annular torque shoulder 36 of the adjacent box end of coupling member 16, as shown in FIG. 5. Coupling assembly 10 of the invention is desirably dimensioned so that as the premium pipe connection is made up to specified torques and torque shoulder interference, there is a forced compression on compressible ring 28. The facing and abutting surfaces of liner end wedge flanges 24, 26 and compressible ring 28 are desirably sized and configured so as to force an interfering wedge between them and thereby trap compressible ring 28 between flanges 24, 26. The narrower width of compressible ring 28 on the side that is radially inward relative to the longitudinal axis of the pipe also cooperates with the inclined surfaces of the liner end wedge flanges to reduce the likelihood that a portion of compressible ring 28 will protrude into the inside diameter ("ID") of coupling assembly 10 when compressible ring 28 is under compression.

According to one embodiment of the invention, liner end wedge flanges 24, 26 are made of a durable, corrosion resistant plastic material and compressible ring 28 is made of a reinforced polymeric material such as 25% glass-filled polytetrafluoroethylene. GRE liner 20 is desirably set back from the top of the weight bore of the coupling ID a distance such that once the end flange 26 is attached to the liner, such as by cementing, the distance from the top of the weight bore to the top of the flange face will be the same as the outside height dimension of compressible ring 28. This is desirably done prior to pumping the mortar backing layer of cement 22 during the lining process. GRE liner 18 at the pin end of the joint of pipe is desirably set back a distance such that when liner end wedge flange 24 is attached to liner 18, the face of flange 24 will extend beyond the end of the pin a specified dimension so as to allow compression on compressible ring 28 when the joint is tightened. The outside diameter ("OD") of compressible ring 28 is preferably selected so that during makeup, the OD of compressible ring 28 is forced against the ID of coupling member 16 to provide a corrosion barrier.

Other alterations and modifications of the invention will like wise become apparent to those of ordinary skill in the art upon reading this specification in view of the accompanying drawings, and it is intended that the scope of the invention disclosed herein be limited only by the broadest interpretation of the appended claims to which the inventors are legally entitled.

We claim:

1. A coupling assembly comprising:
a coupling member having two oppositely facing, premium threaded box ends with an unthreaded, inwardly facing surface disposed therebetween and an annular torque shoulder disposed between the inwardly facing surface and each of the box ends;
first and second coaxially aligned, premium threaded pipe joints, each having a pin end, an annular leading edge at a distal end of the pin end and a glass reinforced epoxy liner;
opposed and spaced apart first and second liner end wedge flanges, the first liner end wedge flange seated against the glass reinforced epoxy liner disposed in the pin end of the first premium threaded pipe joint and the second liner end wedge flange seated against the glass reinforced epoxy liner disposed in the pin end of the second premium threaded pipe joint, said first and second liner end wedge flanges each entirely located radially inward of the annular leading edge and further comprising an inclined side surface, the inclined side surfaces of the first and second liner edge wedge flanges being spaced apart and disposed in facing and oppositely inclined relation to each other;
a compressible, polymeric ring disposed between the facing, spaced apart, inclined side surfaces of the first and second liner edge wedge flanges, the polymeric ring having a wedge-shaped cross-section with oppositely facing, oppositely inclined entirely linear side surfaces, with each oppositely inclined side surface contacting and abutting against the oppositely disposed, cooperatively inclined surface of the first and second liner end wedge flanges to provide a corrosion barrier between the first and second premium threaded pipe joints when the pin ends of the first and second premium threaded pipe joints are threadedly engaged and tightened inside the coupling member to compress the polymeric ring against the unthreaded, inwardly facing surface of the coupling member;
wherein the glass reinforced epoxy liner of the second premium threaded pipe joint extends beyond the annular leading edge of the second premium threaded pipe joint and is partially disposed inward of the inwardly facing surface of the coupling member;
wherein when the pin ends of the first and second premium threaded pipe joints are threadedly engaged and tightened inside the coupling member to compress the polymeric ring, the annular leading edge of the first and second premium threaded pipe joints sealingly contact the corresponding annular torque shoulder of the coupling member and the first and second liner end wedge flanges sealingly contact the inwardly facing surface of the coupling member.

2. The coupling assembly of claim 1 wherein the first and second liner end wedge flanges are made of plastic.

3. The coupling assembly of claim 1 wherein the compressible polymeric ring comprises polytetrafluoroethylene.

4. The coupling assembly of claim 3 wherein the compressible ring comprises 25% glass filled polytetrafluoroethylene.

5. The coupling assembly of claim 1 wherein the compressible polymeric ring is reinforced with filler material.

6. The coupling assembly of claim 5 wherein the filler material comprises glass fibers.

7. The coupling assembly of claim 1 wherein the glass reinforced epoxy liner of the first premium threaded pipe joint has an end that is set back from the pin end of the first premium threaded pipe joint.

* * * * *